Jan. 6, 1942.  G. H. C. CORNER  2,268,571
SEPARABLE FASTENER
Filed Nov. 16, 1938

INVENTOR.
George H. C. Corner
BY
ATTORNEYS.

Patented Jan. 6, 1942

2,268,571

UNITED STATES PATENT OFFICE 2,268,571

SEPARABLE FASTENER

George H. C. Corner, Sutton Coldfield, England, assignor to Talon, Inc., a corporation of Pennsylvania Application November 16, 1938, Serial No. 240,776
In Great Britain November 18, 1937

6 Claims. (Cl. 18—59)

This invention relates to the manufacture of sliding clasp fasteners of the well known type in which fastener members secured to two mounting tapes at small equal distances along the edges thereof are brought into interlocking engagement by means of a slider mounted on the tapes. In particular the invention relates to the manufacture of separable fasteners of the type described, in which the interlocking members are made from non-metallic material.

According to the present invention, partly or completely finished fastener members are machined, molded, stamped, pressed or otherwise formed from an uncured or partly cured plastic material and subsequently affixed to the tape in the said uncured or partly cured state, the curing operation being completed subsequently.

In the preferred form of the invention the plastic material employed is casein or a casein composition. Thus, for example, the dried and powdered plastic material is admixed with a suitable coloring matter, moistened and extruded into the form of a round wire of about ⅛" in diameter. In this form, the wire consisting of uncured casein is very soft and easy to machine or press into any desired shape. The wire may, for example, be formed into a number of individual fastener members which may be subsequently sorted and orientated for example in a machine of the kind described and claimed in Smith Patent No. 1,903,659.

If preferred, however, the fastener members may be formed in any other suitable way, for example, such as shown and described in the application of Sundback, Serial No. 674,056, filed June 2, 1933, Patent 2,169,177, issued August 8, 1939. In some instances, the elements may be formed in place on the fastener stringer by molding or in any other suitable manner.

Figure 1:
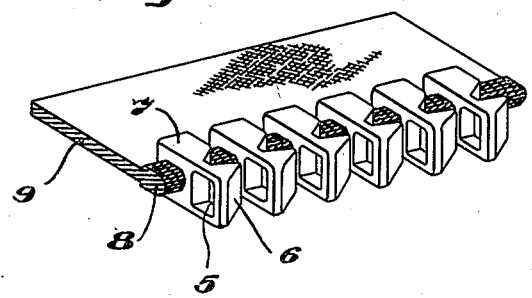
Fig. 1 is a perspective view showing a length of fastener stringer.
Figure 2:
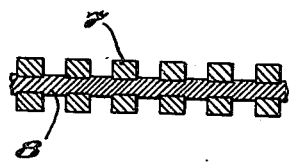
Fig. 2 is a longitudinal sectional view.

The type of fastener member shown in the drawing is of conventional shape having a recess 5 on one side and a correspondingly shaped projection 6 on the opposite side. The fastener members have relatively wide bases 7 extending over the beaded edge 8 of the tape 9. The opening or slot 10 between the bifurcated base portions may be of any suitable shape and preferably has a shallow square corner 11 to provide shoulders to engage over the bead of the tape and hold the fastener member firmly in position. If the fastener members are made separate from the tape they are preferably made slightly larger than the desired finished dimension and the opening 10 may be somewhat wider than in its final closed position on the tape.

The bifurcated base portions may be pushed over the beaded edge of the tape in view of the fact that the bead is of yielding material and will fit tight enough so as to hold itself in place at least temporarily. If desired, the fastener members may also be affixed by an auxiliary adhesive or cement but in the use of casein material it is believed that the contraction undergone during the curing operation will cause the jaws of the members to become firmly clamped on the tape and eliminate the necessity of any auxiliary adhesive. The assembled stringers are then subjected to some suitable chemical treatment, for example, immersion in a formaldehyde solution, until the casein composition has been cured and thereby brought to the required degree of hardness. The stringers are washed and the fastener members polished for example, by dipping in a hypochlorite solution in order to produce a permanent high lustre.

Figure 3:
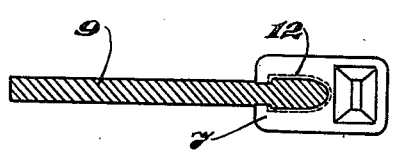
Fig. 3 is a cross-sectional view.
Figure 4:
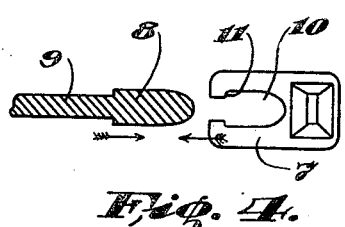
Fig. 4 is a cross-sectional view showing the fastener member ready to be applied to the tape.

The members may, with advantage, be held on the tape during the curing operation by means of a spring-loaded clamping device so that a continual clamping pressure is exerted on the jaws during this shrinkage. This shrinkage of the material is indicated in Fig. 3, the dotted line 12 being intended to show the size of the opening before the curing operation.

Another plastic material which may be used in accordance with the present invention is a rubber composition capable of being cured by suitable vulcanization.

The invention is not limited to the use of fabric mounting tapes and, in order to resist the action of the curing operation on the mounting material, it may be desired to employ flexible metal wire or strip or metal link or bead chain or any other strip material which is not elastic when stressed longitudinally.

The term "casein" used herein denotes in general any protein composition having those characteristic properties of casein which are of outstanding value for the purposes of the present invention.

I claim:

1. The process of making fastener stringers of the class described, comprising forming the fastener members with jaws having square shoulders from uncured or partly cured plastic material which contracts upon curing, assembling the same in uncured state with beaded edged tape by inserting the tape between the jaws, and then finishing the curing operation while the members are on the tape to cause contraction of the fastener members and cause the shoulders clampingly to engage the beaded tape edges.

2. The process of making slide fastener stringers of the class described comprising forming fastener members of casein in an uncured or partly cured state, placing them on a tape stringer and subsequently completely curing the casein material to secure the members firmly to the stringer by contraction during curing.

3. The process of making fastener stringers of the class described, comprising forming the fastener members from a plastic material in an uncured state capable of contracting during the curing process, placing such fastener members on a fastener stringer, and then curing the same to secure attachment of the fastener members to the stringer by contraction during such curing process.

4. The process of making fastener stringers of the class described which comprises forming fastener members from casein, assembling the formed fastener members on a tape stringer, subjecting the fastener members to suitable chemical treatment for curing the casein and bringing it to the required degree of hardness while contracting the formed and assembled fastener members for clampingly attaching them permanently to the tape stringer.

5. The process defined in claim 4 wherein the fastener stringers are afterward washed and the fastener members polished by dipping in a hypochlorite solution for sufficient time to produce a permanent high lustre.

6. The process of making fastener stringers of the class described comprising forming fastener members each with a projection and a recess and a bifurcated base portion from plastic material in an uncured state, assembling such fastener members with a tape in the desired positions with the bifurcated base portions straddling the tape, curing the fastener members while on the tape, and simultaneously applying substantial pressure to the bifurcated base portions to hold them firmly against the tape during the curing operation.

GEORGE H. C. CORNER.